Patented Jan. 13, 1953

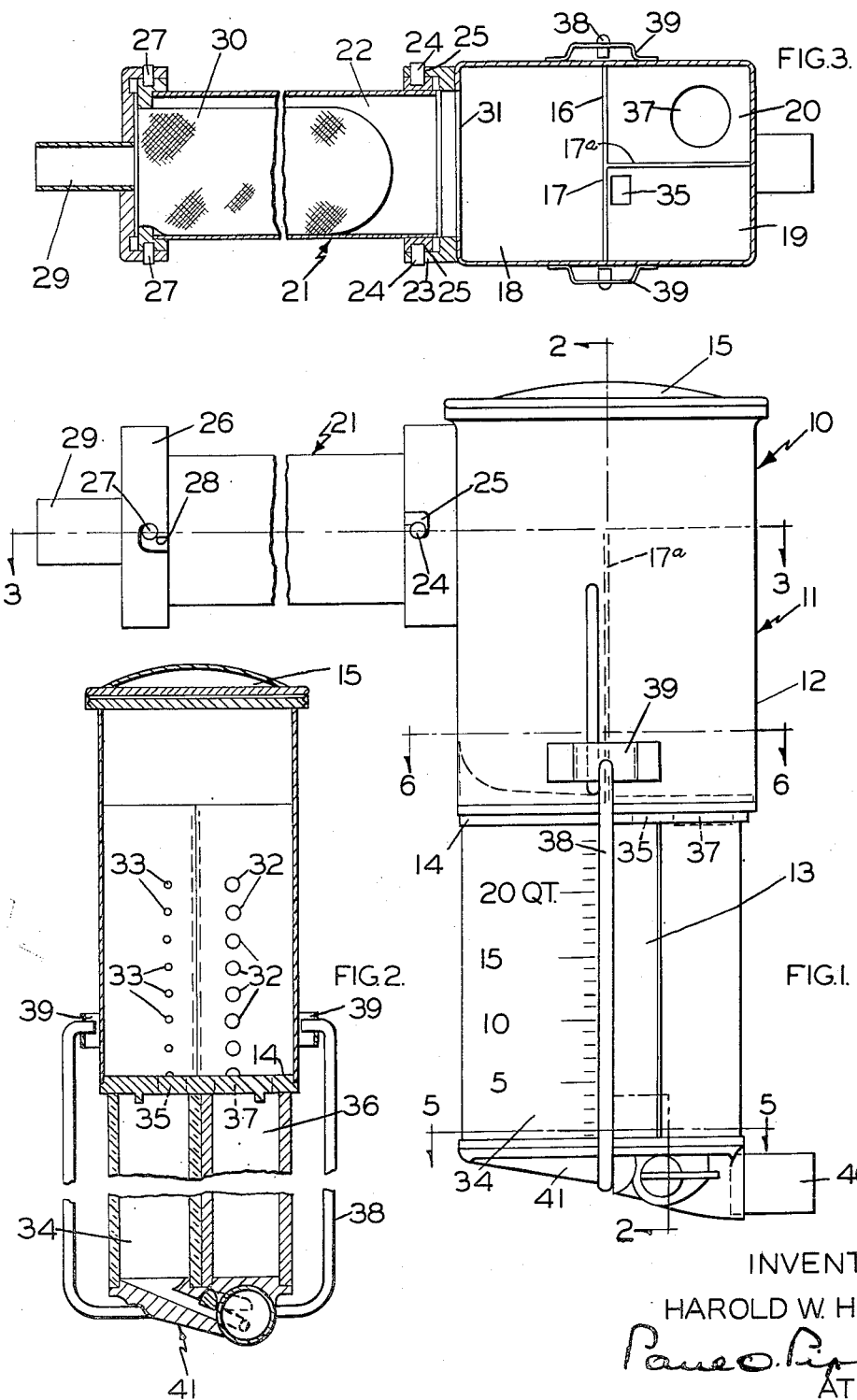

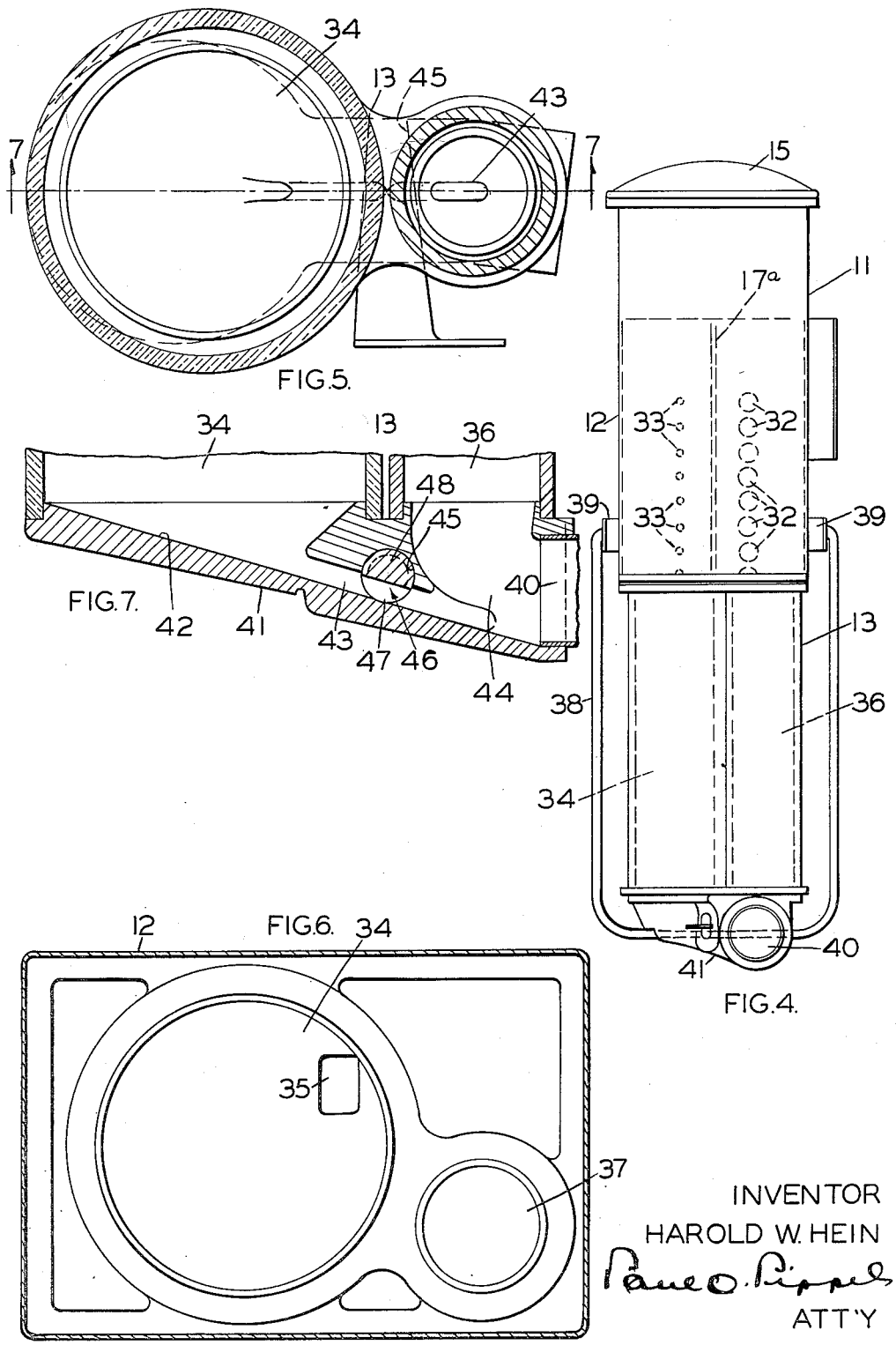

2,625,041

UNITED STATES PATENT OFFICE 2,625,041

FLOW MEASURING DEVICE FOR PIPE LINE SYSTEMS

Harold W. Hein, Chicago, Ill., assignor to International Harvester Company, a corporation of New Jersey Application March 2, 1950, Serial No. 147,239

1 Claim. (Cl. 73—202)

This invention relates to a device for measuring fluid flow. The device more specifically relates to a measuring unit particularly adapted to measure the flow of fluid such as milk being carried within the pipe line system of a milker unit.

In a pipe line milking system the milk is carried directly from the animal to its ultimate destination where it may be treated or cooled. In a system of this type it is exceedingly desirable to provide a simple and practical measuring unit that will indicate the amount of milk that flows through the pipe line during any given milking operation. Applicant has invented a simple, practical and efficient measuring unit that may be inserted in a pipe line system for accurately indicating the quantity of liquid through said system.

It is a principal object, therefore, of this invention to provide an improved, simple, practical and efficient flow measuring device which is particularly adapted for use with a pipe line system.

Another object is to provide a measuring device having a receiving chamber positioned adjacent two first and second chambers, the receiving chamber being arranged to distribute fluid to the first and second chambers in proportionately different amounts, the first chamber being arranged to receive a lesser quantity and being associated with a measuring receptacle.

Another object is to provide an improved measuring device, the measuring device having a measuring chamber which is arranged to receive a definite proportion of the liquid flowing through a pipe line milking system.

A still further object is to provide an improved flow measuring device, the device having connections whereby the device may be readily attached to the pipe lines of a pipe line milking system.

A still further object is to provide a flow measuring device having in combination therewith a strainer unit adapted to strain sediment from the liquid as it is transported through a pipe line system.

Still another object is to provide an improved measuring unit for a pipe line system, the unit including a measuring chamber having a transparent section provided with graduations denoting the quantity of liquid which has flowed through the pipe line system.

A further object is to provide a flow measuring device having a measuring chamber adapted to receive a proportionate amount of the entire quantity of liquid traveling through the pipe line system, the measuring chamber also having a connection with the system whereby the liquid within the measuring chamber may be discharged to the system.

These and further objects will become more readily apparent upon a reading of the specification when examined in connection with the drawings.

In the drawings:

Fig. 1 is a side elevational view of a flow measuring device.

Fig. 2 is a sectional view through the flow measuring device of Fig. 1 taken substantially along the line 2—2 of Fig. 1.

Fig. 3 is a sectional plan view taken substantially along the line 3—3 of Fig. 1.

Fig. 4 is an end elevational view of the flow measuring device shown in Fig. 1.

Fig. 5 is a sectional view of the lower portion of a flow measuring device taken along the line 5—5 of Fig. 1.

Fig. 6 is a sectional view through the flow measuring device taken substantially along the line 6—6 of Fig. 1.

Fig. 7 is a sectional view through the lower portion of a flow measuring device taken substantially along the line 7—7 of Fig. 5.

Referring particularly to Figs. 1, 2 and 3, a flow measuring device is generally designated by the reference character 10. The flow measuring device 10 consists essentially of a container structure 11 having an upper section 12 which may be made of a sheet metal construction. A lower section 13 is connected to the lower portion of the upper section 12 with a bottom wall 14 separating the two sections. A cover 15 connects to the upper section 12.

The upper section 12 is provided with partition wall sections 16, 17 and 17a which divide the container 11 into a receiving chamber 18 and first and second chambers 19 and 20 respectively. The receiving chamber is connected to a pipe line connecting assembly 21 as best shown in Figs. 1 and 3. The connecting assembly 21 comprises a sheet metal cylinder 22 which is held in assembly with the container 11 by means of a collar 23. The metal cylinder 22 has a plurality of outwardly projecting pins 24 which are inserted and secured in bayonet slots 25 formed in the collar 23. The other end of the sheet metal cylinder 22 is connected to a collar 26 by means of a plurality of pins 27 which engage bayonet slots 28 in the collar 26. A pipe connection 29 is secured to the collar 26, this connection 29 being in communication with the interior of the sheet metal cylinder 22.

A strainer bag 30 is positioned within the cylinder 22, the bag having its upper end positioned to receive liquid entering through the pipe connection 29. The strainer bag 30 may be constructed of any suitable reticulated material such as screen cloth, etc. Liquid flowing through the strainer bag 30 will enter into the receiving chamber 18 through an opening 31.

The partition wall 16 is provided, as best shown in Figs. 2 and 4, with a plurality of vertically spaced openings 32. Likewise, the partition wall 17 is provided with a plurality of vertically spaced openings 33. The openings 32 are of considerably larger cross sectional dimension than the openings 33, the purpose of which will become apparent later in the description of the operation. The openings 32 and 33 are arranged so that they are all positioned at substantially the same vertical level with respect to the bottom wall 14.

A measuring chamber 34 is provided in the lower section 13, this chamber being positioned directly beneath the first chamber 19. An opening 35 in the bottom wall 14 places the chambers 19 and 34 into communication with each other. An outlet chamber or connection 36 is also provided in the lower section 13. The chamber 36 is positioned beneath the second chamber 20 and is in communication therewith by means of an opening 37 which extends through the bottom wall 14. The section 13 containing the chambers 34 and 36 is securely connected to the bottom wall 14 by means of a bail-shaped member 38 which is pivotally connected at its upper ends to brackets 39 fastened to the upper section 12. This arrangement is particularly well disclosed in Figs. 2 and 3. The outlet chamber 36 is provided at its lower end with a pipe connection 40, the pipe connection being arranged so that the outlet chamber 36 may be readily adapted to the continuation of the pipe line system.

The lower section 13 is provided with a bottom section 41, this section having a wall 42 which slopes downwardly in a direction toward the pipe connection 40. Referring particularly to Fig. 7, it can be seen that the measuring chamber 34 and the outlet chamber 36 may be placed into communication by means of a passage 43. Thus liquid within the measuring chamber 34 may be directed to the lower end of the outlet chamber 44. The bottom section 41 is provided with a bore 45 which extends transversely with respect to the passage 43. The bore 45 is arranged to receive a petcock or valve 46 of conventional construction. The petcock 46 includes a recess 47 which may be placed into registry with the passage 43. The petcock further includes a portion 48 which may be adjusted to block the passage 43.

In the operation, the pipe connections 29 and 40 may be connected to pipe sections (not shown) of a pipe line system. For the purpose of the present disclosure it may be assumed that the measuring device 10 is adapted for use with a pipe line milking system. It must of course be realized that the unit can readily be utilized with other types of piping systems which may carry various types of materials.

Liquid flowing through the pipe line system enters into the flow measuring device 10 through the pipe connection 29. As the liquid flows through the cylinder 22 it is strained by means of the strainer 30. In view of the novel arrangement of the pins 24 and 27 in relation to the bayonet slots 25 and 28 it can readily be seen that the strainer assembly is quickly detachable for cleaning or replacement purposes. The liquid enters into the receiving chamber 18 through the opening 31. Depending upon the rate of the flow, the liquid level begins to rise in the receiving chamber 18. As it rises within this chamber, certain quantities of liquid will flow through the openings 32 and 33. It has been determined that the liquid level must be considerably above the opening which may be situated immediately below the liquid level before these openings function fully to permit liquid to pass therethrough. In other words a desirable condition is present when the liquid level in the receiving chamber is above all of the openings and the liquid pressure is sufficient so that all the openings are functioning properly. In view of the large cross sectional dimension of the openings 32, a relatively large quantity of liquid flows from the receiving chamber 18 to the second chamber 20. Simultaneously with the gravity flow of the liquid from the receiving chamber 18 to the second chamber 20 a lesser proportionate quantity of liquid flows through the openings 33 into the first chamber 19, the chambers being separated by partition 17a. The exact proportion which flows into the chamber 19 can, of course, be determined by varying the relative difference in size between the openings. The liquid which is escaping from the receiving chamber 18 is therefore now divided into separate compartments or chambers. The liquid which is directed into the second chamber 20 escapes downwardly through an opening 37 into the outlet chamber 36. The outlet chamber is continuously in communication with the pipe line system (not shown) by means of the pipe connection 40 and thus any liquid which enters into the outlet chamber 36 is free to immediately travel on its way.

The liquid which enters into the first chamber 19 drops downwardly into the measuring chamber 34 through the opening 35. The petcock 46 is turned so that the portion 48 blocks the passage 43. Thus liquid which enters into the measuring chamber 34 is trapped therein and the liquid level within this chamber rises in relation to the amount of liquid delivered thereto. The measuring chamber 34 is made of a transparent plastic or similar material, a portion of the chamber being provided with graduations as best indicated in Fig. 1. The graduations may be calibrated to designate certain quantities of liquid such as quarts, gallons, etc. As the liquid level rises within the measuring chamber 34 the operator of the milking system can quickly determine the amount of liquid which has passed through the system by checking the graduation which corresponds to the liquid level within the chamber. The size of the openings 33 may be proportioned with respect to the openings 32 in any practical manner desired and the graduations may be coordinated to indicate an accurate measurement of the milk flow through the system.

The measuring chamber 34 is of sufficient capacity to indicate the largest quantity of milk that may flow through a system during any given operation. Thus when the milking operation has been completed the milk which is retained in the measuring chamber 34 may be quickly delivered to the piping system by simply turning the petcock 46 so that the recess 47 is in communication with the recess 43. The chamber 34 can thus be emptied into the pipe line system in an expeditious manner without in any way contaminating or losing the milk which has been used for the measuring purpose. It must be understood, of course, that the flow measuring device can be utilized in a number of ways. It can, for instance, be utilized to measure the milk productivity of one animal, several animals, or the entire herd, depending to a large extent on the position in which it is placed within the system. The particular operation which has been described above merely shows one manner of use without limiting the scope of the invention.

It can now be readily understood that an improved flow measuring unit has been provided, the unit clearly accomplishing the desired objects of the invention. It must be recognized that changes in structure and mode of operation may be made without departing from the spirit of the invention as disclosed or the scope thereof as defined in the appended claim.

What is claimed is:

A flow measuring device comprising a container structure including upper and lower container sections, upright partition walls extending transversely within the upper container section for separating the same into a receiving chamber and first and second chambers positioned in side-by-side relation, one of said partition walls having a plurality of first vertically spaced openings providing for communication between said receiving chamber and said first chamber, said partition wall further having a plurality of second vertically spaced openings of proportionately larger cross-sectional dimension than said first openings to provide for communication between said receiving chamber and said second chamber, the first openings being horizontally spaced relative to the second openings, each of the first openings being positioned at substantially the same vertical lever as each of the second openings whereby liquid delivered to the receiving chamber is free to flow to the first chamber in a lesser proportionate volume than the volume flowing into the second chamber, a conduit communicating with said receiving chamber, a filtering element within the conduit, connecting means on said conduit adapted to connect the measuring device to a pipe line, said lower container section including a measuring chamber, there being an opening between said first chamber and said measuring chamber, said lower section further including an outlet chamber in communication with said second chamber, a pipe line connection communicating with said outlet chamber, valve means between said measuring chamber and said pipe line connection for controlling the flow of liquid from said measuring chamber to said pipe line connection, and means detachably connecting said upper and lower container sections in assembly.

HAROLD W. HEIN.

REFERENCES CITED

The following references are of record in the file of this patent:

UNITED STATES PATENTS

| Number | Name | Date |
|---|---|---|
| 185,001 | Wasmansdorff | Dec. 5, 1876 |
| 336,172 | Sutherland | Feb. 16, 1886 |
| 1,080,052 | Englebright | Dec. 2, 1913 |
| 1,130,792 | Burton | Mar. 9, 1915 |
| 1,465,447 | Lyman | Aug. 21, 1923 |
| 1,901,481 | Van Schaack | Mar. 14, 1933 |
| 2,043,636 | Thompson | June 9, 1936 |
| 2,434,723 | Shook | Jan. 20, 1948 |